United States Patent
Peschke et al.

(10) Patent No.: US 6,451,467 B1
(45) Date of Patent: Sep. 17, 2002

(54) FLOW CONTROL SUBSYSTEM FOR A FUEL CELL SYSTEM

(75) Inventors: Norman Peschke, Clifton Park; Curtis Richardson, Voorheesville, both of NY (US)

(73) Assignee: Plug Power Inc., Latham, NY (US)

(*) Notice: Subject to any disclaimer, the term of this patent is extended or adjusted under 35 U.S.C. 154(b) by 88 days.

(21) Appl. No.: 09/608,048

(22) Filed: Jun. 30, 2000

(51) Int. Cl.[7] ................................................ H01M 8/04
(52) U.S. Cl. ........................... 429/23; 429/22; 429/34; 429/35
(58) Field of Search ........................... 429/23, 34, 35, 429/22

(56) References Cited

U.S. PATENT DOCUMENTS

| | | | |
|---|---|---|---|
| 3,915,747 A | * | 10/1975 | Summers et al. |
| 5,141,824 A | * | 8/1992 | Hirota ................ 429/34 X |
| 6,083,637 A | * | 7/2000 | Walz et al. ................ 429/17 |

* cited by examiner

*Primary Examiner*—John S. Maples
(74) *Attorney, Agent, or Firm*—Trop, Pruner & Hu, P.C.

(57) ABSTRACT

An automated reactant flow control subsystem is provided for a fuel cell system. The subsystem is achieved with a minimum of parts for decreased cost and increased reliability. The subsystem includes a fail-safe solenoid-actuated three-way valve in the fuel line that achieves very low pressure drop and very low parasitic load requirements. The subsystem also includes a fuel bypass system such as a flare, and a controller to automatically interlock the fuel and oxidant streams of the fuel cell.

23 Claims, 2 Drawing Sheets

FLOW CONTROL SUBSYSTEM FOR A FUEL CELL SYSTEM

BACKGROUND

The invention relates to a flow control subsystem for a fuel cell system.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

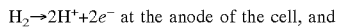

$H_2 \rightarrow 2H^+ + 2e^-$ at the anode of the cell, and

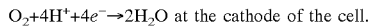

$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells.

The fuel cell stack may be part of a fuel cell stack system that supplies electrical power to an electrical load. For example, for a residential fuel cell system, the electrical load may be established by the various power consuming devices of a house. To furnish AC power to the house, the fuel cell system typically converts the DC voltage that is provided by the fuel cell stack into AC voltages. The fuel cell system may include a fuel processor to convert a hydrocarbon (natural gas or propane, as examples) into a reformate flow that furnishes the hydrogen to the fuel cell stack. The fuel cell system may also include an air blower that produces an air flow that furnishes the oxygen to the fuel cell stack.

For various reasons, it is desirable in a fuel cell system to be able to bypass reactant flows from the fuel cell stack. For example, upon start-up of a fuel processor, the initial reformate stream may contain high levels of carbon dioxide that would damage the electrode catalysts of the fuel cell stack. On start-up, it may thus be desirable to burn any off-specification fuel in a flare. Bypassing fuel to a flare on start-up may also provide system warm-up capabilities for outdoor systems in cold climates. Other operating modes, such as routine and emergency shut down scenarios, are also provided through fuel bypass capabilities. It will be appreciated that the performance, reliability and efficiency of a fuel cell system is increased by improving the performance reliability and efficiency of the reactant flow control subsystem of the fuel cell system. Likewise, as fuel cell technology is transitioned into consumer products, it is also desired to have such a flow control subsystem that is inexpensive and easy to manufacture.

There is a continuing need for an arrangement in a fuel cell system that efficiently and dependably addresses one or more of the issues stated above.

SUMMARY

An automated reactant flow control subsystem is provided for a fuel cell system. The subsystem is achieved with a minimum of parts for decreased cost and increased reliability. The subsystem includes a fail-safe solenoid-actuated three-way valve in the fuel line that achieves very low pressure drop and very low parasitic load requirements. The subsystem also includes a fuel bypass system such as a flare, and a controller to automatically interlock the fuel and oxidant streams of the fuel cell.

In general, in one embodiment, the reactant flow control system includes a three-way valve adapted to selectively switch a fuel stream between a bypass path and a fuel cell stack path. The valve is connected to a supply line, a bypass line, and a stack line, and has a bypass line seating orifice and a stack line seating orifice. A plunger in the valve directly abuts the stack seating orifice when the valve is in a bypass position, and directly abuts the bypass seating orifice when the valve is in a operating position. The bypass position is used to divert the fuel stream away from the fuel cell, for example, to flare off-specification fuel on start up or shutdown of the fuel cell system. The operating position is used to supply the fuel stream to the fuel cell during normal operation.

An important feature of the design is that the valve is configured to achieve very low pressure drop when in the operating position. For example, the stack line seating orifice is sized to have a cross-sectional area that is larger than the cross-sectional area of the stack line (for example 120% or larger) such that when the valve is in the operating position, the pressure drop across the valve is less than 5 inches water column (IWC) at a fuel stream flow of 20 cubic feet per minute (CFM). In some embodiments, the stack line seating orifice has about the same cross-sectional area as the stack line, and the pressure drop may be as low as 0.5 IWC at 20 CFM of fuel flow through the valve. Another feature of the design is that the plunger within the valve directly abuts the stack line seating orifice, and the orifice leads directly to the stack line. In this manner, when the valve is in the operating position, the fuel flow through the valve has a more direct path and lower pressure drop than in conventional 3-way valve designs, such as those typical in hydraulic systems where the flow path through such valves is often circuitous and restricted. The valve housing and plunger shape, which generally define the flow path through the valve, are also configured to provide a smooth and direct flow path through the valve to promote laminar flow through the valve.

The low pressure drop aspect of the above-described design features makes such a system advantageous for a fuel cell system that is operated at close to atmospheric pressure (for example, less than one atmosphere), since less energy is required to push reactants through the system.

Another important feature of the design is that it is configured to achieve failsafe operation with minimum power requirements. The failsafe operation refers to the fact that the plunger in the valve is biased to the bypass position. Thus, as an example, if the overall system were to lose power, the flow control system could bypass the fuel stream to a flare system. The bypass position of the valve can thus be referred to as the non-energized position, and the operating position can thus be referred to as the energized position.

In some embodiments, the valve is solenoid actuated by an electromagnetic coil surrounding the stem of a spring-loaded plunger. When a sufficient power is supplied to the coil (for example 10 Watts), the resulting electromagnetic force compresses the plunger spring, placing the valve in the operating position while the power is supplied. In other embodiments, the power requirements of such operation are minimized by utilizing a second coil around the plunger stem. The second coil is used to hold the plunger in the operating position since this requires less power (for example 5 Watts) than the power needed to actuate the plunger. The lower power requirements of the second coil thus replace the higher power requirements of the first coil during normal operation of the system. The power required to maintain operation of the fuel cell system may be referred to as the parasitic load. The two coil approach provides increased system efficiency by reducing the parasitic load on the system.

Finally, in some embodiments, the flow control subsystem is associated only with the fuel lines of the system. Whereas a need may exist to be able to bypass off-specification fuel (for example, fuel that is high in carbon monoxide, which would damage the fuel cell electrode catalysts), a similar need may not exist to bypass the oxidant gas. For example, in a start-up or shut-down operating mode, fuel might be bypassed away from the stack to a flare system, and the oxidant stream of the system might continue flowing through the stack on its way to the flare. In other embodiments, the flow control subsystem may be associated with both the fuel lines and the oxidant lines to bypass all reactant flows from the stack when desired. For example, in a PEM system where membrane dry-out is a concern, it may be desirable to bypass sub-saturated oxidant flow from the stack on start-up.

Advantages and other features of the invention will become apparent from the following description, from the drawing, and from the claims.

DETAILED DESCRIPTION

Figure 1:
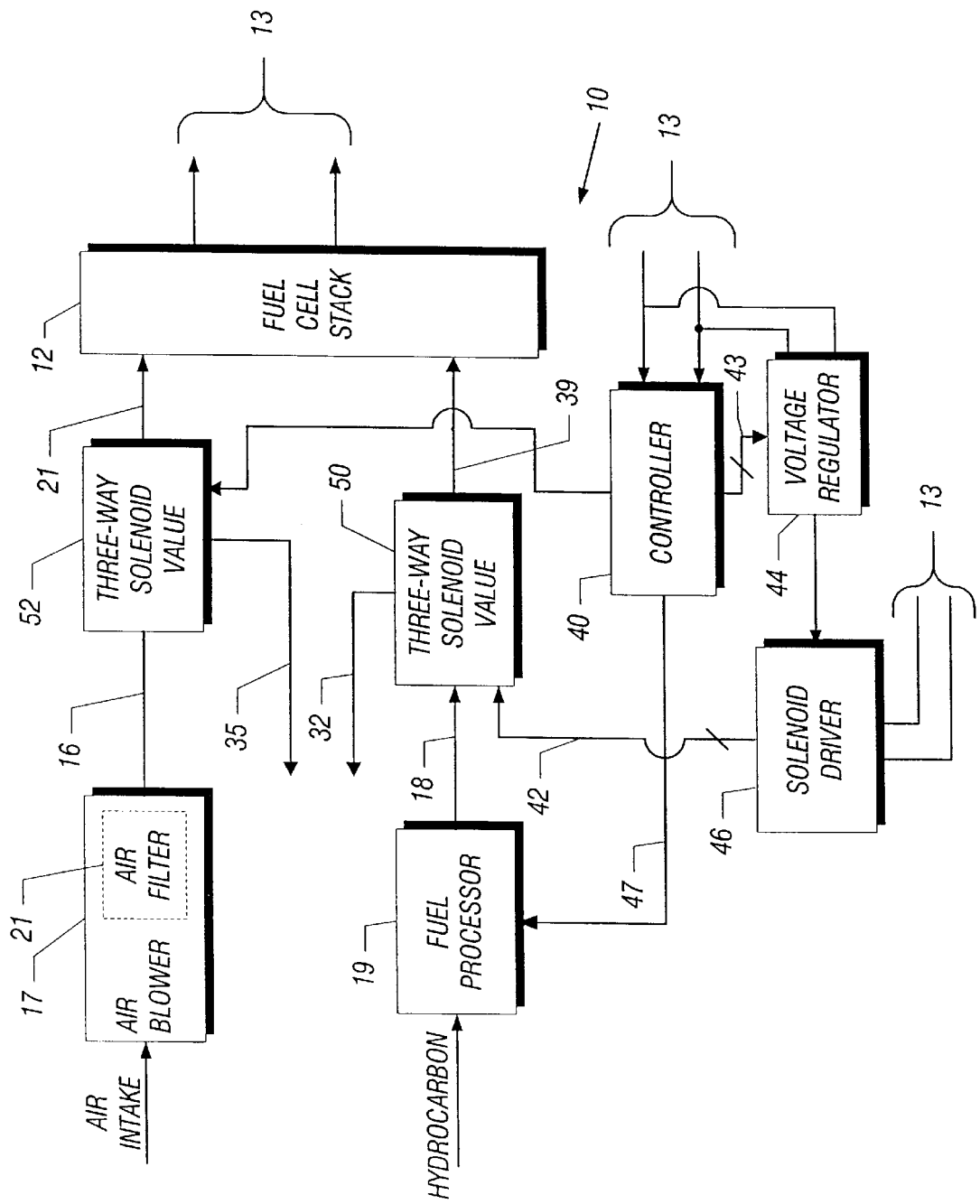
FIG. 1 is a schematic diagram of a fuel cell system according to an embodiment of the invention.

Referring to FIG. 1, an embodiment 10 of a fuel cell system in accordance with the invention includes a fuel cell stack 12 that consumes reactants (oxygen and hydrogen) to produce power for a load. As an example, the fuel cell system 10 may be a residential fuel cell system that supplies power to a house. For purposes of furnishing oxygen to the fuel cell stack 12, the fuel cell system 10 includes an air blower 17 that produces an air flow that is provided to an air flow input line 16. As an example, the pressure of the air in the air flow input line 16 may be approximately 27.7 inches of water column, 1 psig, at 70° C. maximum.

For purposes of furnishing hydrogen to the fuel cell stack 12, the fuel cell system 10 may include a fuel processor 19 that furnishes a reformate fuel stream (that contains hydrogen) to a reformate flow input line 18. As an example, the pressure of the reformate flow in the reformate flow input line 18 may vary from about 23 inches to 46 inches of water column at 70° C. maximum, with the variation being attributable to the varying demand required by the fuel cell stack 12 to respond to varying power demands from its load.

It is possible that during the course of its operation, the fuel cell system 10 may not be able to sustain power production due to a breakdown or a problem with the fuel cell stack 12 or the overall fuel cell system 10. For example, the air flow may be substantially interrupted due to, as examples, failure of the air blower 17 or severe clogging of an air filter 21 that filters particulates from the air flow. Continuing the example, eventually, the air flow may decrease to a point at which reactions in the fuel cell stack are not sustainable, and thus, a terminal voltage (present at output terminals 13) of the fuel cell stack 12 may significantly drop. Thus, the drop in the terminal voltage or power production may indicate that shut down of the fuel cell system 10 is needed in order for repairs and maintenance to be performed. Thus, for purposes of preventing damage to the system 10 upon this or any other occurrence that disrupts the system's power generation, the system 10 includes a three-way solenoid valve 50 that responds to a control signal to shut off the reformats flow to the fuel cell stack 12 as described below.

More particularly, in some embodiments of the invention, the valve 50 is coupled between the reformate flow input line 18 and a manifold intake line 39 that is in communication with a reformate inlet manifold opening of the fuel cell stack 12 to deliver the reformate flow to the fuel cell stack 12 when the valve 50 is open.

The valve 50 is either fully open in its energized operating mode or fully closed in its non-energized bypass mode. In this manner, when the fuel processor 19 first powers up, the valve 50 is in its non-energized bypass mode and diverts the reformate flow from the reformate flow input line 18 to a reformate flow bypass line 32. The diversion of the reformate flow from the stack 12 continues until a controller 40 of the system 10 determines (via a fuel sensor (not shown), for example) that the quality of the reformate is sufficient, or that the valve should otherwise be energized. In this manner, when the controller 40 determines that the fuel processor 19 is producing quality reformate, the controller 40 causes (via control lines, or wires 43) a voltage regulator 44 to provide a sufficient power (10 Watts at voltage of about 48 volts DC, for example) via control lines, or wires 42, to the valve 50 to open the valve 50, as described below. It is noted that the energy that is used to energize the valve 50 to cause the valve 50 to open may come from the fuel cell stack 12. Therefore, as described below, if the system 10 is unable to maintain power production for whatever reason, the energy that is supplied to keep the valve 50 open disappears, an event that automatically places the valve 50 in its bypass mode of operation and shuts off the reformate flow. A solenoid driver 48 may be coupled between the voltage regulator 44 and the valve 50, in some embodiments of the invention, for purposes of enhancing the current drive capability of the voltage regulator 44.

The valve 50, in its open mode, closes communication between the reformate flow input 18 and bypass 32 lines and establishes communication between the reformate flow input 18 and manifold intake 39 lines. After the valve 50 opens, the controller 40, in some embodiments of the invention, causes the voltage regulator 44 to operate in a pulse width modulation (PWM) mode for purposes of communicating a PWM signal to the valve 50 (via the wires 42) to lower the average voltage to the valve 50 hold the valve 50 open. As described below, when the valve 50 is in its energized operating mode, the pressure that is exerted by the fluid flowing through the valve 50 aids in maintaining the open state of the valve 50, thereby reducing the required average voltage to maintain the valve 50 in its open mode of operation.

When the average DC voltage that is established by the PWM signal decreases below a threshold level, the valve 50 closes communication between the reformate flow input 18 and manifold intake 39 lines and opens communication between the reformate flow input 18 and reformate flow bypass 32 lines. Because the voltage regulator 44 and driver 46 are both powered by the fuel cell stack 12, a change in the terminal voltage of the fuel cell stack 12 influences the amplitudes of the voltages that are provided to control the valve 50. Therefore, in the event that the generation of power by the fuel cell stack 12 is substantially disrupted, the voltage that is furnished to keep the valve 50 open decreases. As a result of this voltage decrease, the valve 50 enters the closed mode, a mode in which the valve 50 closes communication between the input reformate flow line 18 and the manifold intake line 39 and opens communication between the input reformate flow line 18 and the bypass reformate line 32. As a result, the flow of the reformate to the stack 12 is shut off to effectively shut the power production by the stack 12, and thus, potential damage to the stack 12 is prevented and bypass control of the fuel is achieved.

In some embodiments of the invention, the system 10 may include a three-way solenoid valve 52 that controls communication between the air input line 16, an air bypass line 35 and an air line 21 that extends to an air inlet manifold opening of the stack 12. The valve 52 may have a similar design to the valve 50. In this manner, the valve 52 may establish communication between the air flow input line 16 and the air intake line 21 when the fuel cell stack 12 is furnishing a sufficient voltage and reroute the air from the air input line 16 to an air bypass line 35 when the voltage decreases below a predetermined threshold.

The controller 40 may perform functions other than regulating operation of the valve 50. For example, in some embodiments of the invention, the controller 40 may monitor a current (via a current sensor (not shown)) that is produced by the stack 12 and the cell voltages (via a cell voltage scanning circuit (not shown)) of the stack 12 to determine a power output of the stack 12. For this power output, the controller 40 may then control (via control lines, or wires 47) the rate at which the fuel processor 19 produces the reformate.

Figure 2:
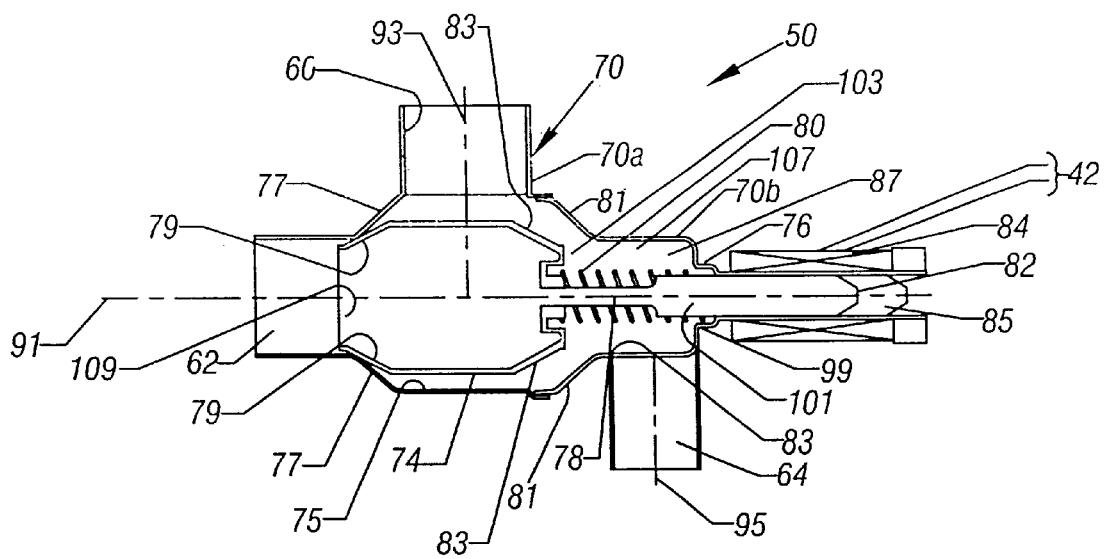
FIG. 2 is a schematic diagram of a valve of the system of FIG. 1 in a closed mode according to an embodiment of the invention.
Figure 3:
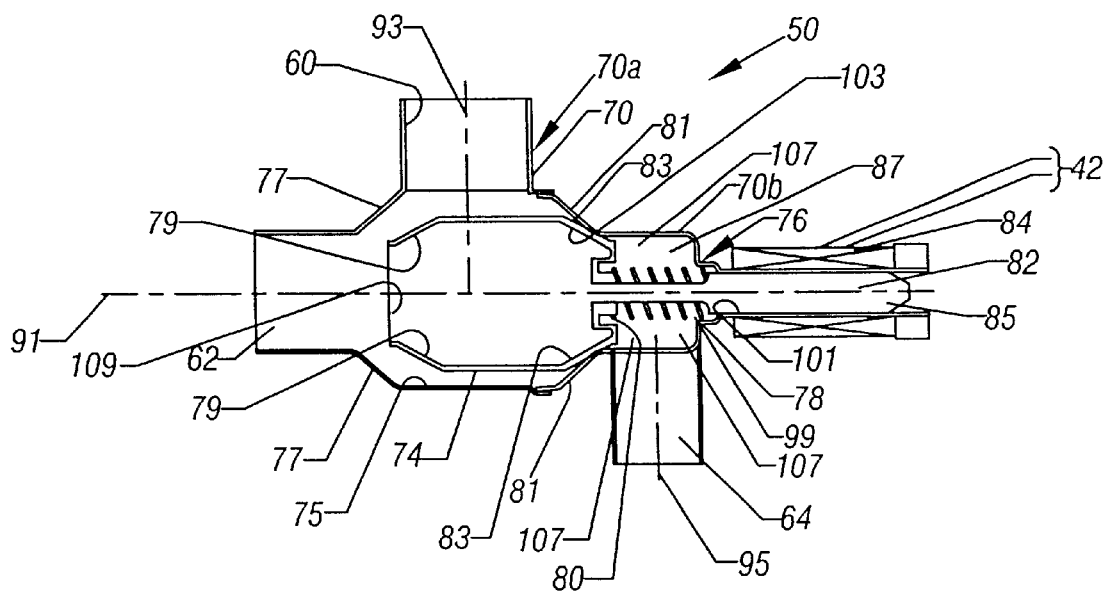
FIG. 3 is a schematic diagram of a valve of the system of FIG. 1 in an open mode according to an embodiment of the invention.

In some embodiments of the invention, the valve 50 may have a design that is depicted in FIGS. 2 and 3. However, other designs are possible. As shown in FIGS. 2 and 3, the valve 50 may include a plunger assembly 76 that is operated in a manner (e.g., based on the voltage or current that appears across the wires 42) to control communication between a fuel inlet port 60 that is in communication with the input reformate flow line 18 (also referred to as the supply line) and a fuel outlet port 62 that is in communication with the manifold intake line 39 (also referred to as the stack line). The plunger assembly 76 also controls communication between the fuel inlet port 60 and a fuel bypass port 64 that is in communication with the bypass line 32.

More particularly, when the valve 50 does not receive the appropriate voltage level to sustain or establish its open mode of operation, the plunger assembly 76 is in a closed position (shown in FIG. 2), a position in which the plunger assembly 76 blocks communication between the reformate flow inlet port 60 and the reformate flow outlet port 62 and allows communication between the reformate flow inlet port 60 and the reformate flow bypass port 64. When the valve 50 does receive an appropriate voltage level, the plunger assembly 76 assumes an open position (shown in FIG. 3), a position in which the plunger assembly 76 blocks communication between the reformate flow inlet port 60 and the reformate flow bypass port 64 and allows communication between the reformate flow inlet port 60 and the reformate flow outlet port 62.

In some embodiments of the invention, the plunger assembly 76 operates inside a housing 70 (formed from two housing sections 70a and 70b) in which is formed the ports 60, 62 and 64. In some embodiments of the invention, the housing 70 forms a generally circularly cylindrical plunger chamber 75 (also referred to as the internal plenum of the valve 50) that houses a generally circularly cylindrical plunger head 74 of the plunger assembly 76. The plunger chamber 75 is in communication with the fuel inlet port 60 that circumscribes an axis 93 and opens to the top side of the valve 50, as depicted in FIGS. 2 and 3. The plunger head 74 is concentric to and generally moves in a direction along an axis 91 (inside the plunger chamber 75) that is circumscribed by the fuel outlet port 62 and is orthogonal to the axis 93.

The plunger head 74 has a closed end with a peripheral beveled surface 79 that mates with a corresponding beveled surface 77 (stack line seating orifice) of the housing 70 to close off the outlet port 62 when the plunger assembly 76 is in the closed position (and the valve 50 is in the closed mode), as depicted in FIG. 2. Thus, the beveled surface 77 of the housing 70 forms a valve seat. As shown, when the plunger assembly 76 is in the closed position, the reformate may flow from the reformats flow inlet port 60 through an opening 103 of the chamber 75. The opening 103 may also be referred to as the supply orifice of the valve 50. The opening 103 leads into a spring chamber 107 (of the housing 70) that is always in communication with the bypass port 64. In some embodiments of the invention, the opening 103 circumscribes the axis 91, and the port 64 circumscribes an axis 95 that is parallel to the axis 93 and opens on the bottom side of the valve 50, as depicted in FIGS. 2 and 3. The opening 103 is generally sized to as not to introduce significant pressure drop to fluids flowing through the valve 50.

When the plunger assembly 76 is in the open position (and the valve 50 is in the open mode), the reformate may flow from the fuel inlet port 60 to the outlet port 62, as depicted in FIG. 3. When the plunger assembly 76 is in the open position, a closed end of the plunger head 74 seals off the opening 103 to closed off the fuel bypass port 64. In this manner, this closed end of the plunger head 74 includes a peripheral beveled surface 83 that mates with a corresponding surface (bypass line seating orifice) 81 of the housing 70 that forms a valve seat about the opening 103.

The size relationship between the fuel inlet port 60 and the stack line seating orifice 77 may be configured to minimize pressure drop through the valve 50. For example, in a prototype of an embodiment of the invention, the fuel inlet port 60 has about the same cross-sectional area as the fuel line 18 to the valve 50, and the stack line seating orifice 77 has about the same cross-sectional area as the line 39 exiting the valve 50 to the stack. The stack line seating orifice 77 is sized to have a cross-sectional area approximately 190% larger than the cross-sectional area of the stack line 39 such that when the valve 50 is in the energized position, the pressure drop across the valve 50 is less than 5 IWC at a fuel stream flow through the valve 50 of 20 CFM. In some embodiments, the stack line seating orifice 77 has about the same cross-sectional area as the stack line 39. In other possible embodiments, the pressure drop through the valve 50 may be also be lower, such as being less than 0.5 IWC at 20 CFM of fuel flow through the valve 50.

Another feature of the design is that the plunger head 74 directly abuts the stack line seating orifice 77, and the orifice 77 leads directly to the stack line 39. In this manner, when the valve 50 is in the operating position, the fuel flow through the valve has a more direct path and lower pressure drop than in conventional 3-way valve designs, such as those typical in hydraulic systems where the flow path through such valves is often circuitous and restricted. The valve housing and plunger shape, which generally define the flow path through the valve, are also configured to provide a smooth and direct flow path through the valve to promote laminar flow through the valve.

For purposes of moving the plunger assembly 76 between the open and closed positions, in some embodiments of the invention, the valve 50 includes a compression spring 80 (a stainless steel compression spring, for example) and an electromagnetic coil 84 (a 48 volt DC coil, for example) that interact with the plunger assembly 76 to form a solenoid-type control. In this manner, the plunger assembly 76 includes a stem that is formed from two stem portions 78 and 82 (described below) and is coaxial with the axis 91. The stem is connected to the end of the plunger head 74 near the opening 103 and extends through the opening 103 inside the electromagnetic coil 84 that is also coaxial with the axis 91.

More particularly, the stem portion 82 (at the unattached end of the stem) resides inside a generally cylindrical coil chamber 85 (of the housing 70) that is coaxial with the axis 91 and connects to the spring chamber at an opening 101. The coil chamber 85 is circumscribed by the electromagnetic coil 84. The stem portion 82 exhibits ferromagnetic properties so that longitudinal movement of the stem along the axis is influenced by the current that flows through the coil 84. The stem portion 82 may have a larger radius about the axis 91 than the other stem portion 78 that is connected between the stem portion 82 and the plunger head 74 and resides in the coil chamber 107.

The stem portion 82 is circumscribed by the spring 80 that has one end connected to the plunger head 74 and the opposite end connected to the housing 70 near the opening 99 where the spring chamber 107 meets the coil chamber 85. The spring 80 exerts a force (on the plunger assembly 76) for purposes of seating the plunger head 74 in the opening 109 to place the valve 50 in the closed mode, as depicted in FIG. 2. Conversely, the force that is exerted by the electromagnetic coil 84 exerts a force (on the plunger assembly 76) for purposes of seating the plunger head 74 in the opening 103 to place the valve 50 in the open mode, as depicted in FIG. 3.

Thus, due to the above-described arrangement, when a sufficient voltage level is applied to the electromagnetic coil 84 (via the wires 42), a corresponding current is created in the coil 84 to cause the force that is developed by the coil 84 to overcome the force that is exerted by the coiled spring 80. As a result, the plunger head 74 is seated in the opening 103 to place the valve in the open mode (shown in FIG. 3). Once open, most of the sealing force to maintain the plunger assembly 76 in the open position is obtained from the pressure that is exerted by the flow of the reformate that passes through the valve 50. When no voltage or not enough voltage is applied to the wires 42, the force that is exerted by the coiled spring 80 dominates to overcome the combined force that is exerted by the fluid pressure and the coil 84 (if any force is exerted by the coil 84) and seat the plunger head 74 in the opening 109 to place the valve in the closed mode (see FIG. 2). In a prototype of an embodiment of the invention, the first coil to actuate the plunger was a 48 VDC coil operated at about 8 Watts, and the second coil to hold the plunger in the activated position was a 48 VDC coil operated at about 4 Watts. The invention is not limited by the particular coils that are used, including any special design of the coils with respect to the voltage, current or power required.

Among the other features of the valve 50, in some embodiments of the invention, the housing 70 may be formed out of metal, such as 316 non-magnetic stainless steel, for example. In other embodiments of the invention, the housing 70 may be formed from teflon or PPA-GF45 plastic, as examples. The stem portion 82 of the plunger assembly 76 may be made out of 400 series magnetic stainless steel. The beveled surfaces 77, 79, 81 and 83 that form the valve seats and the corresponding mating portions of the plunger head 74 may be coated with silicon rubber, for example. In some embodiments of the invention, the entire plunger head 74 may include an outer silicon rubber jacket, and this jacket may have a thickness of about 0.03 inches, for example. Other arrangements are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell reactant flow control subsystem comprising:
   a three-way valve adapted to selectively switch a fuel stream between a bypass path and a fuel cell stack path;
   the valve being connected to a supply line, a bypass line, and a stack line;
   the valve having a bypass line seating orifice and a stack line seating orifice;
   the valve having a plunger that directly abuts the stack seating orifice when the valve is in a bypass position, and that directly abuts the bypass seating orifice when the valve is in a operating position;
   wherein a cross-sectional area of the stack line seating orifice is larger than a cross-sectional area of the stack line such that when the valve is in an operating position, the pressure drop across the valve is less than 5 inches water column at a fuel stream flow of 20 cubic feet per minute.

2. The fuel cell reactant flow control subsystem of claim 1, wherein in the operating position the pressure drop across the valve is less than 2 inches water column at a fuel stream flow of 20 cubic feet per minute.

3. The fuel cell reactant flow control subsystem of claim 1, wherein in the operating position the pressure drop across the valve is less than 1 inches water column at a fuel stream flow of 20 cubic feet per minute.

4. A fuel cell reactant flow control subsystem comprising:
   a fuel source adapted to provide a fuel stream through a supply line to a solenoid-driven three-way valve, the valve being further connected to a fuel cell stack through a stack line and to a fuel bypass system through a bypass line;

the valve having a non-energized position wherein the fuel is directed from the supply line to the bypass line, and an energized position wherein the fuel is directed from the supply line to the stack line;

the valve having a spring-loaded plunger tending to place the valve in the non-energized position;

the valve having an internal plenum, the plenum having a supply orifice, a bypass line seating orifice and a stack line seating orifice, wherein a cross-sectional area of the stack line seating orifice is larger than a cross-sectional area of the stack line, and a cross-sectional area of the stack line seating orifice is larger than a cross-sectional area of the stack line; and in the non-energized position, the plunger directly abuts the stack line orifice, and in the energized position, the plunger directly abuts the bypass line orifice.

5. The fuel cell reactant flow control subsystem of claim 1, further comprising:

the valve having a first electromagnetic coil adapted to compress the spring-loaded plunger to place the valve in the energized position in response to a first power supply; and the valve having a second electromagnetic coil adapted to hold the spring-loaded plunger in the energized position in response to a second power supply when the first power supply is shut off.

6. The fuel cell reactant flow control subsystem of claim 5, wherein the first power supply is less than 15 Watts.

7. The fuel cell reactant flow control subsystem of claim 5, wherein the first power supply is less than 10 Watts.

8. The fuel cell reactant flow control subsystem of claim 5, wherein the second power supply is less than 5 Watts.

9. The fuel cell reactant flow control subsystem of claim 5, wherein the second power supply is less than 3 Watts.

10. The fuel cell reactant flow control subsystem of claim 5, further comprising a controller adapted to: (i) provide the first power supply to the first magnetic coil; (ii) provide the second power supply to the second magnetic coil; and (iii) shut off the first power supply after the second power supply is provided.

11. The fuel cell reactant flow control subsystem of claim 4, wherein in the non-energized position the valve provides a pressure drop to the fuel stream of less than 10 inches water column at a fuel stream flow of 20 cubic feet per minute, and in the energized position the valve provides a pressure drop to the fuel stream of less than 5 inches water column at a fuel stream flow of 20 cubic feet per minute.

12. The fuel cell reactant flow control subsystem of claim 11, wherein in the non-energized position, the valve provides a pressure drop to the fuel stream of less than 5 inches water column at a fuel stream flow of 20 cubic feet per minute, and in the energized position the valve provides a pressure drop to the fuel stream of less than 2 inches water column at a fuel stream flow of 20 cubic feet per minute.

13. The fuel cell reactant flow control subsystem of claim 11, wherein in the non-energized position, the valve provides a pressure drop to the fuel stream of less than 2 inches water column at a fuel stream flow of 20 cubic feet per minute, and in the energized position the valve provides a pressure drop to the fuel stream of less than 1 inches water column at a fuel stream flow of 20 cubic feet per minute.

14. The fuel cell reactant flow control subsystem of claim 4, wherein the cross-sectional area of the stack line seating orifice is at least as large as the cross-sectional area of the stack line.

15. The fuel cell reactant flow control subsystem of claim 4, wherein the cross-sectional area of the stack line seating orifice is at least 150% as large as the cross-sectional area of the stack line.

16. The fuel cell reactant flow control subsystem of claim 4, wherein the cross-sectional area of the stack line seating orifice is at least 190% as large as the cross-sectional area of the stack line.

17. The fuel cell reactant flow control subsystem of claim 4, wherein the fuel bypass system comprises a flare.

18. The fuel cell reactant flow control subsystem of claim 16, wherein the flare burns fuel from the bypass line using air from a fuel cell cathode exhaust stream.

19. The fuel cell reactant flow control subsystem of claim 16, further comprising an oxidant stream connected to the fuel cell stack, and an oxidant bypass system adapted to bypass the oxidant stream from the stack to the flare.

20. A fuel cell reactant flow control subsystem comprising:

a fuel source adapted to provide a fuel stream through a supply line to a solenoid-driven three-way valve, the valve being further connected to a fuel cell stack through a stack line and to a fuel bypass system through a bypass line;

the valve having a non-energized position wherein the fuel is directed from the supply line to the bypass line, and an energized position wherein the fuel is directed from the supply line to the stack line;

the valve having a spring-loaded plunger tending to place the valve in the non-energized position;

the valve having a first magnetic coil adapted to compress the spring-loaded plunger to place the valve in the energized position in response to a first power supply;

the valve having a second magnetic coil adapted to hold the spring-loaded plunger in the energized position in response to a second power supply when the first power supply is shut off;

the valve having an internal plenum, the plenum having a supply orifice, a bypass line seating orifice and a stack line seating orifice, wherein a cross-sectional area of the stack line seating orifice is at least as large as a cross-sectional area of the stack line;

in the non-energized position, the plunger directly abuts the stack line opening, and in the energized position, the plunger directly abuts the bypass line opening; and in the non-energized position the valve provides a pressure drop to the fuel stream of less than 10 inches water column at a fuel stream flow of 20 cubic feet per minute, and in the energized position the valve provides a pressure drop to the fuel stream of less than 5 inches water column at a fuel stream flow of 20 cubic feet per minute.

21. The fuel cell reactant flow control subsystem of claim 20, wherein in the non-energized position the valve provides a pressure drop to the fuel stream of less than 5 inches water column at a fuel stream flow of 20 cubic feet per minute, and in the energized position the valve provides a pressure drop to the fuel stream of less than 2 inches water column at a fuel stream flow of 20 cubic feet per minute.

22. The fuel cell reactant flow control subsystem of claim 20, wherein in the non-energized position the valve provides a pressure drop to the fuel stream of less than 2 inches water column at a fuel stream flow of 20 cubic feet per minute, and in the energized position the valve provides a pressure drop to the fuel stream of less than 1 inches water column at a fuel stream flow of 20 cubic feet per minute.

23. The fuel cell reactant flow control subsystem of claim 21, wherein the first power supply is less than 10 Watts, and the second power supply is less than 5 Watts.

* * * * *